Patented Oct. 27, 1942

2,299,807

UNITED STATES PATENT OFFICE 2,299,807

TREATMENT OF CELLULOSIC TEXTILE MATERIALS

Charles Dunbar, Blackley, Manchester, England, assignor to Imperial Chemical Industries Limited, a corporation of Great Britain No Drawing. Application June 5, 1939, Serial No. 277,566. In Great Britain June 10, 1938

4 Claims. (Cl. 8—136)

This invention relates to a treatment of cellulosic textile materials, and particularly to a treatment of cellulosic textile materials whereby they are endowed with softness and with non-creasing properties, which properties are at the same time resistant to washing.

It is known to treat cellulosic textile materials with synthetic resins, with synthetic resin components or with low molecular weight condensation products of synthetic resin components, the treated materials being subsequently subjected to a process whereby there is produced a higher degree of polymerisation of the resinous components, with the object of imparting to the cellulosic textile materials non-crushing and non-creasing properties. Such treated cellulosic materials have a harsh feel and are stiffer than is pleasant or desirable.

This invention has as an object to devise a method whereby cellulosic materials can be given non-crushing and non-creasing properties without giving them a harsh feel or unduly stiffening the fabric. A further object is to devise such a method whereby the non-crushing and non-creasing properties will be resistant to washing. A still further object is to provide non-creasing and non-crushing cellulosic materials which will not be stiff nor have a harsh feel and which will retain these properties after washing. Further objects will appear hereinafter. These objects are accomplished by the following invention.

I have discovered that I can achieve these objects if the textile materials are treated with an aqueous dispersion of an ethylene polymer and are treated either simultaneously or before or after with a medium comprising a synthetic resin, synthetic resin components or with low molecular weight condensation products of synthetic resin components, the treatment or treatments being followed by drying, and by a heat treatment process at a temperature substantially greater than the softening temperature of the ethylene polymer with or without the application of mechanical pressure.

The ethylene polymers to be used for the purposes of this invention are obtained by subjecting ethylene, with or without a small content of oxygen, to a very high pressure and a moderately elevated temperature as described in United States Patent No. 2,153,553. The mention of ethylene polymers herein is intended to include in addition to the simple polymers the ethylene interpolymers and derivatives of the simple polymers, for example, such as described in British Specification No. 497,643 and in British Specification No. 481,515. The solid simple ethylene polymers obtained as outlined above melt or soften above about 100° C., usually between 110° C. and 200° C., depending upon the molecular weight of the particular polymer, have high molecular weights ranging from 2000 upwards to 24,000 or even higher, e. g. 30,000 or 40,000, and are essentially saturated products corresponding in composition substantially to $(CH_2)_x$. They are soluble in xylene at its boiling point and are unaffected by prolonged contact with air at ordinary temperature. These solid simple polymers as ordinarily prepared show a crystalline structure when subjected to X-ray diffraction analysis. The molecular weights mentioned are the approximate values determined by the method devised by H. Staudinger (see Berichte der deutschen Chemischen Ges., 1934, 67B, 1247 et seq.). The melting or softening points are the values obtained by the "ball and ring" method.

The aqueous dispersions of the ethylene polymers, with which there may also be incorporated a proportion of a dispersing or emulsifying agent, such as, for example, triethanolamine stearate, are prepared, for example, by the method described in the specification of British application No. 16,892/38.

The synthetic resins to be used for the process of the invention are obtained by the polymerisation of urea or thiourea or derivatives thereof or a phenol with an aldehyde or an aldehyde-yielding substance; there may also be used low molecular weight condensation products of these substances, or there may be used in the substances themselves, the said substances being subsequently condensed and polymerised on the textile material itself. It is preferred to use the products derived from urea and formaldehyde or formaldehyde-yielding substances; particularly suitable are the low molecular weight condensation products from these substances. Suitable compositions and methods for their applications to textiles are described, for example, in British Specifications Nos. 291,474, 304,900, 431,703 and 449,243.

In carrying the preferred practice of the invention into effect the cellulosic textile materials are impregnated with the aqueous dispersion of the ethylene polymer to which has been added a low molecular weight condensation product of the resin components or to which has been added proportions of the resin components themselves. The treated materials are squeezed or centrifuged, dried and subjected to a heat treatment at a temperature substantially greater than the softening point of the ethylene polymer, for example, at a temperature of 100–130° C. If desired, the textile materials may be treated in two stages, wherein the low molecular weight condensation products of the resin components or the resin components themselves are applied thereto, from an aqueous medium, either before or after the application of the aqueous dispersion of the ethylene polymer. It is preferred to apply the treating solutions to the materials in such amounts and in such concentrations, that there is deposited on the finished textile materials between 1% and 5% of their weight of the ethylene polymer.

The invention is illustrated but not limited by the following examples in which the parts are by weight.

Example 1

A mixture of 200 parts of urea, 450 parts of neutral 40% formaldehyde and 16 parts of ammonia (sp. gr. 0.880) is boiled for 2 minutes and then cooled rapidly. To this mixture is added 570 parts of water, 216 parts of a 15% aqueous dispersion of ethylene polymer (containing 5% triethanolamine stearate as the dispersing agent) and a solution of 18 parts of ammonium dihydrogen phosphate dissolved in 180 parts of water.

A plain weave cotton fabric is impregnated with the mixture, lightly squeezed, dried in a current of warm air at a temperature of 60°–80° C. and heated at a temperature of 125° C. for 4 minutes. The fabric is washed at a temperature of 50° C. for 5 minutes in a solution containing 2 parts of soap and 5 parts of soda in 1000 parts of water, rinsed and dried. The fabric has a full soft handle and is resistant to creasing.

The aqueous dispersion of ethylene polymer used in this example was prepared as follows:

100 parts of ethylene polymer (molecular weight less than 20,000), 25 parts of stearic acid and 12.5 parts of triethanolamine were mixed with 1000 parts of trichloroethylene and the mixture was heated at a temperature of 70–90° C. under a reflux condenser until the polymer was dissolved. To the hot solution was added, with stirring, 570 parts of water containing 3.3 parts of potassium hydroxide, previously heated to a temperature of 60–70° C. The emulsion so obtained was passed through a valve-homogeniser, removed therefrom, stirred and maintained at a temperature of 60–80° C., whilst a stream of moist air was passed over the stirred liquid, so that the trichloroethylene was volatilised.

Example 2

A solution of a low molecular weight condensation product of urea and formaldehyde is prepared by mixing together 220 parts of urea, 440 parts of 40% formaldehyde and 18 parts of ammonia (sp. gr. 0.880), boiling the mixture for 2 minutes and then cooling it rapidly. To this cold mixture is then added a solution of 15 parts of ammonium dihydrogen phosphate, in 150 parts of water, together with sufficient water to bring the density to 20° Tw.

Material made from yarns composed of viscose rayon staple fibre is impregnated with this solution, squeezed so that the material retains its own weight of the solution, dried at 60° C., heated at 125° C. for 4 minutes, washed in a solution containing ½% sodium carbonate and ¼% soap at 50° C. for 5 minutes, rinsed in water and dried. The so treated material is impregnated with a mixture of 1 part of the aqueous dispersion of the interpolymer of ethylene and the diethyl ester of itaconic acid prepared according to the method of Example 5 of the specification of British application No. 16,892/38, filed June 7, 1938, and 4 parts of water, squeezed so that the material retains about its own weight of the mixture at 60° C. and heated at 125° C. for 2 minutes. The treated material has a full soft handle and is resistant to creasing.

Example 3

A dress material woven from viscose rayon staple fibre yarns is impregnated with a mixture of 1 part of the aqueous dispersion of the interpolymer of ethylene and methyl methacryate prepared according to the method of Example 4 of the specification of British application No. 16,892/38, and 4 parts of water, squeezed so that the material retains about its own weight of the dispersion, dried and heated at 125° C. for 4 minutes. The material is then treated with a solution of a low molecular weight condensation product of urea and formaldehyde, dried, heated, washed, rinsed and dried as described in Example 2. The treated material has a soft handle associated with anti-crease properties.

Example 4

Spun viscose dress material is treated with a solution of a low molecular weight condensation product of urea and formaldehyde, dried, heated, washed, rinsed and dried as described in Example 2. The treated material is then impregnated with a mixture of 1 part of the aqueous dispersion of the chlorinated ethylene polymer prepared according to the method of Example 6 of the specification of British application No. 16,892/38, and 3 parts of water, squeezed so that it retains about its own weight of the mixture, dried and heated at 110° C. for 3 minutes. The after treatment with the chlorinated ethylene polymer dispersion confers a soft handle on the material without impairing its anti-crease properties.

As many apparently widely different embodiments of the invention may be made without departing from the spirit and scope thereof, it is to be understood that the invention is not limited to the specific embodiments thereof except as defined in the appended claims.

I claim:

1. A process for obtaining textile materials characterized by softness and by non-creasing and non-crushing properties, said process comprising impregnating said material with an aqueous dispersion of ethylene polymer and with a substance selected from the class consisting of urea-formaldehyde and phenol-formaldehyde resins and ingredients forming such resins upon heat-treatment, and heating the textile material thus treated above the softening point of said ethylene polymer, said ethylene polymer being a solid at normal temperatures, corresponding in composition substantially to $(CH_2)_x$, and by X-ray diffraction analysis showing a crystalline structure.

2. The process set forth in claim 1 in which there is deposited on the textile material between 1% and 5% of its weight of the ethylene polymer.

3. A process which comprises treating textile material with an aqueous dispersion of a mixture comprising ethylene polymer and a substance selected from the class consisting of urea-formaldehyde and phenol-formaldehyde resins and ingredients forming such resins upon heat-treatment, and heating the textile material thus treated above the softening point of said ethylene polymer, said ethylene polymer being a solid at normal temperatures, corresponding in composition substantially to $(CH_2)_x$, and by X-ray diffraction analysis showing a crystalline structure.

4. Textile material which is characterized by softness and by non-creasing and non-crushing properties and which is impregnated with an ethylene polymer and with a synthetic resin, said ethylene polymer being a solid at normal temperatures, corresponding in composition substantially to $(CH_2)_x$, and by X-ray diffraction analysis showing a crystalline structure, said synthetic resin being selected from the class consisting of urea-formaldehyde and phenol-formaldehyde resins.

CHARLES DUNBAR.